United States Patent [19]

Myers et al.

[11] 4,243,575

[45] Jan. 6, 1981

[54] FILLED THERMOPLASTIC RESIN COMPOSITIONS

[75] Inventors: Donald C. Myers, Stephentown, N.Y.; Phillip S. Wilson, Louisville, Ky.

[73] Assignee: General Electric Company, Pittsfield, Mass.

[21] Appl. No.: 60,742

[22] Filed: Jul. 25, 1979

[51] Int. Cl.³ .............................................. C08L 67/00
[52] U.S. Cl. .................. 260/37 PC; 521/54; 521/180; 525/146; 525/148; 525/152; 525/464
[58] Field of Search .................................... 260/37 PC

[56] References Cited

U.S. PATENT DOCUMENTS

| | | | |
|---|---|---|---|
| B 520,878 | 4/1976 | Horn et al. | 260/37 PC |
| 4,014,849 | 3/1977 | Horn et al. | 260/37 PC |
| 4,110,299 | 8/1978 | Mark | 260/37 PC |
| 4,147,707 | 4/1979 | Alewelt | 260/37 PC |

FOREIGN PATENT DOCUMENTS

| | | | |
|---|---|---|---|
| 2721886 | 11/1978 | Fed. Rep. of Germany | 260/37 PC |
| 51-14852 | 8/1976 | Japan | 260/37 PC |

*Primary Examiner*—Morton Foelak
*Attorney, Agent, or Firm*—Salvatore C. Mitri

[57] ABSTRACT

Filled thermoplastic resin compositions are provided wherein the filler component is compatible with and does not deleteriously affect the physical properties of the resin. The filler employed is a particulate, solid sphere which can be pre-treated with a surface active agent prior to being incorporated in the resin. The resin composition can also contain other ingredients such as impact modifiers, glass fillers, and the like.

24 Claims, No Drawings

FILLED THERMOPLASTIC RESIN COMPOSITIONS

This invention is directed to filled polycarbonate compositions comprising an admixture of a high molecular weight aromatic polycarbonate and a particulate filler.

BACKGROUND OF THE INVENTION

Polycarbonate polymers are excellent molding materials as products made therefrom have high impact strength, toughness, high transparency, wide temperature limits (high impact resistance below −60° C. and a UL thermal endurance rating of 115° C. with impact), good dimensional stability, high creep resistance and electrical properties, and the like.

Thermoplastic molding compounds such as polycarbonates are costly to produce and one of the more commonly accepted methods used to reduce their cost is to fill the base resin with a relatively inexpensive particulate filler. In addition to reducing costs, particulate fillers often impart valuable characteristics such as reduced mold shrink and lower warp. Particulate fillers can also improve the compressive strength, modulus, and impact strength of the compounded resin. In some instances, higher filler loading can increase thermal conductivity leading to shorter molding cycles.

However, particulate fillers can have serious, deleterious effects on thermoplastic resins, particularly aromatic polycarbonates. For example, basic materials such as nepheline cyanite or many of the calcined clays cause severe resin degradation with a resulting drop in physical properties. In many cases, degradation is so severe during molding that test specimens fall apart when the mold opens. Other particulate fillers such as glass beads made from highly basic glass also cannot be used with polycarbonates as they degrade the resin. Hollow, thin-walled glass spheres have also been tried but they failed under loading and resulted in polycarbonates having poor physical properties. More recently, the use of ground fly ash was tried but this, too, resulted in polycarbonate compositions having poor physical properties.

DESCRIPTION OF THE INVENTION

It has now been found that an economic particulate filler can be used with high molecular weight aromatic polycarbonate resins that is compatible with the resin and which does not deleteriously affect the desired physical properties of the resultant polycarbonate composition. The particulate filler of the invention is an amorphous, alumino silicate glass which is recovered from fly ash, the magnitite portion of which has been removed and which is commonly used as an additive in concrete. This particulate filler comprises solid spheres having a specific gravity of about 2.4, a bulk density of 75–80 lbs./ft.$^3$, a batch mass median diameter of 5–6 microns with less than 3 weight percent having a diameter larger than 10 microns and none larger than 25 microns, and a pH of about 3–8. These particulate, solid, spherical fillers are commercially available under the trademark, SPHEREFIL 10, and are hereinafter referred to as cenospheres, a term used by those skilled in the art.

To obtain the polycarbonate compositions of the invention, the cenospheres are mechanically mixed with the polycarbonate resin in amounts of about 2–40% by weight, preferably 10–30% by weight, based upon the total weight of the polycarbonate composition following which the mixture can be extruded, the extrudate pelletized, and the pellets can thereafter be molded into shaped articles.

In the practice of this invention, the high molecular weight aromatic polycarbonates that can be employed are homopolymers and copolymers and mixtures thereof which have an intrinsic viscosity (I.V.) of 0.40 to 1.0 dl./g. as measured in methylene chloride at 25° C. and that are prepared by reacting a dihydric phenol with a carbonate precursor.

Typical of some of the dihydric phenols that can be employed are bisphenol-A, [2,2-bis(4-hydroxyphenyl)-propane], bis(4-hydroxyphenyl)methane, 2,2-bis(4-hydroxy-3-methylphenyl)propane, 4,4-bis(4-hydroxyphenyl)heptane, 2,2-(3,5,3′,5′-tetrachloro-4,4′-dihydroxydiphenyl)propane, 2,2-bis(3,5,3′,5′-tetrabromo-4,4′-dihydroxydiphenyl)propane, (3,3′-dichloro-4,4′-dihydroxydiphenyl) methane. Other dihydric phenols of the bisphenol type are also available, such as are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic polycarbonates of this invention. Also employed in the practice of this invention may be blends of any of the above materials to provide the aromatic polycarbonate.

The carbonate precursor can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, di-(halophenyl) carbonates such as di(-chlorophenyl) carbonate, di-(bromophenyl) carbonate, di-(trichlorophenyl) carbonate, di-(tribromophenyl) carbonate, etc., di(alkylphenyl) carbonates such as di-(tolyl) carbonate, etc., dinaphthyl) carbonate, di-(chloronaphthyl) carbonate, phenyl tolyl carbonate, chlorophenyl chloronaphthyl carbonate, etc., or mixtures thereof. The haloformates suitable for use include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic polycarbonates of this invention can be prepared by employing a molecular weight regulator, an acid acceptor and a catalyst. The molecular weight regulators which can be employed include monohydric phenols such as phenol, chroman-I, paratertiarybutylphenol, parabromophenol, primary and secondary amines, etc. Preferably, phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalysts which can be employed can be any of the catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyl-triphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

The polyfunctional aromatic compounds contain at least three functional groups which are carboxyl, carboxylic anhydride, haloformyl or mixtures thereof. Examples of these polyfunctional aromatic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride or trimellitic acid or their haloformyl derivatives.

Also, included herein are blends of a linear polycarbonate and a branched polycarbonate.

PREFERRED EMBODIMENT OF THE INVENTION

In order to more fully and clearly illustrate the present invention, the following examples are set forth, it being understood that the examples are intended to be illustrative and not limitative of the invention. In the examples, all parts and percentages are by weight unless otherwise specified. Physical properties of test samples obtained in the following examples were determined as follows:

Notched and unnotched Izod (NI and UNI, respectively) as per ASTM D-256;
Flexural yield (FY) and flexural modulus (FM) as per ASTM D-790;
Tensile yield (TY), tensile break (TB) and tensile elongation (TE) as per ASTM D-638;
Tensile impact (TI) as per ASTM D-1822;
Heat distortion temperature under load (DTUL) as per ASTM D-648;
Melt Flow (MF) as per ASTM D-1238, condition O;
Double gated unnotched Izod (DG) as per ASTM D-256*.

*The procedure for this test is the same as that for unnotched Izod except that the test specimen employed is a bar gated at each end to produce a weld line at the center of the bar.

EXAMPLE 1

One hundred (100) parts of an aromatic polycarbonate, prepared from 2,2-bis(4-hydroxyphenyl)propane (bisphenol-A) and phosgene in the presence of an acid acceptor and a molecular weight regulator and having an intrinsic viscosity (I.V.) of about 0.507 was mixed with cenospheres by tumbling the ingredients together in a laboratory tumbler. The resulting mixture was then fed to an extruder which was operated at about 265° C., and the extrudate was comminuted into pellets. The pellets were then injection molded at about 315° C. into test specimens of about 5 by ½ by ⅛ inch thick and these specimens were then subjected to further testing.

EXAMPLE 2

Following the procedure of Example 1, polycarbonate compositions containing 5–60 weight percent cenospheres (CS) were extruded and formed into pellets. The intrinsic viscosity of the pellets was obtained to determine the affect on intrinsic viscosity (I.V.) of the base resin at the various cenosphere concentrations. The results obtained are shown in Table I below:

TABLE I

| Intrinsic Viscosity of Polycarbonate Containing Cenospheres | |
|---|---|
| Cenospheres (CS) (Wt. %) | Intrinsic Viscosity of Polycarbonate Pellets (dl./g.) |
| 0 | 0.507 |
| 5 | 0.449 |
| 10 | 0.451 |
| 15 | 0.433 |
| 20 | 0.425 |
| 30 | 0.420 |

As can be seen from Table I, there was only a slight drop in I.V. as the amount of cenosphere content was increased to 30 weight percent. Above 30 weight percent cenosphere content, a significant drop in I.V. was encountered as well as extruder screw slippage. At 40 weight percent cenospheres, extrusion could be accomplished with surging, but at 60 weight percent cenospheres, the material leaving the die head had the texture of wet sand.

EXAMPLE 3

The procedure of Example 2 was repeated except that a commercially obtained polyethylene available under the product designation "LB-742" and a commercially obtained triblock rubber compound [styrene-b-(ethylene-butylene)-b-styrene] available under the product identification "Kraton G-1651" were also included with the cenospheres. Test samples were obtained as described in Example 1 and the physical properties of these samples were determined. The results are set forth in Table II below wherein "CS" denotes the cenosphere of the invention, "PE" denotes the polyethylene, "TBR" denotes the triblock rubber compound, and the "Control" identifies the polycarbonate sample of Example 1 without filler.

TABLE II

| Physical Properties of Filled Polycarbonates | | | | | | | | | | | | |
|---|---|---|---|---|---|---|---|---|---|---|---|---|
| Filler (Wt. %) | | | NI (0.125") | UNI (0.125") | NI (0.250") | FY ($\times 10^{-3}$) | FM ($\times 10^{-3}$) | TY ($\times 10^{-3}$) | TB ($\times 10^{-3}$) | TE (%) | DTUL @ 264 psi (°F.) | MF |
| CS | PE | TBR | | | | | | | | | | |
| 5 | — | — | 3.1 | >40.0 | 1.75 | 14.5 | 378 | 8.88 | 9.78 | 82.0 | 267 | 9.61 |
| 10 | — | — | 2.7 | >40.0 | 1.69 | 14.5 | 385 | 8.87 | 8.47 | 60.0 | 264 | 9.85 |

TABLE II-continued

Physical Properties of Filled Polycarbonates

| Filler (Wt. %) | | | NI (0.125") | UNI (0.125") | NI (0.250") | FY ($\times 10^{-3}$) | FM ($\times 10^{-3}$) | TY ($\times 10^{-3}$) | TB ($\times 10^{-3}$) | TE (%) | DTUL @ 264 psi (°F.) | MF |
|---|---|---|---|---|---|---|---|---|---|---|---|---|
| CS | PE | TBR | | | | | | | | | | |
| 15 | — | — | 2.0 | >40.0 | 1.17 | 14.4 | 408 | 8.86 | 8.28 | 58.0 | 265 | 10.32 |
| 20 | — | — | 1.5 | >37.0 | 1.17 | 14.5 | 444 | 8.77 | 7.47 | 45.7 | 259 | 10.63 |
| 30 | — | — | 0.8 | 11.3 | 0.74 | 14.5 | 484 | 0 | 8.98 | 4.3 | 264 | 10.63 |
| 40 | — | — | 0.6 | 4.2 | 0.53 | 13.4 | 586 | 0 | 8.98 | 2.0 | 262 | 15.16 |
| 5 | 2 | — | 11.3 | >40.0 | 2.97 | 13.6 | 361 | 8.78 | 9.53 | 76.3 | 267 | 9.38 |
| 15 | 2 | — | 3.4 | >40.0 | 2.08 | 13.6 | 402 | 8.21 | 8.19 | 63.3 | 263 | 10.19 |
| 30 | 2 | — | 0.87 | 10.8 | 0.74 | 13.9 | 484 | 0 | 8.24 | 5.0 | 261 | 9.97 |
| 5 | 4 | — | 12.0 | >40.0 | 4.04 | 13.0 | 346 | 8.50 | 10.5 | 96.7 | 267 | 9.30 |
| 15 | 4 | — | 4.2 | >40.0 | 2.51 | 13.0 | 382 | 7.99 | 8.3 | 68.3 | 262 | 9.85 |
| 30 | 4 | — | 0.87 | 14.1 | 0.84 | 13.1 | 473 | 0 | 6.41 | 5.0 | 262 | 10.88 |
| 5 | — | 5 | 13.3 | >40.0 | 6.91 | 12.9 | 344 | 8.36 | 9.48 | 83.3 | 265 | 9.22 |
| 10 | — | 5 | 9.3 | >40.0 | — | 12.9 | 338 | — | — | — | 265 | — |
| 15 | — | 5 | 5.9 | >40.0 | 2.5 | 13.0 | 370 | 7.95 | 8.36 | 73.0 | 263 | 9.30 |
| 20 | — | 5 | 1.2 | >36.7 | — | 13.2 | 392 | — | — | — | 256 | 14.41 |
| 40 | — | 5 | 0.2 | 3.25 | — | — | — | — | — | — | — | — |
| Control | | | 16.0 | >40.0 | 1.66 | 13.5 | 340 | 9.0 | 9.5 | 110.0 | 270 | 9.22 |

The results in Table II reveal that the changes in the physical properties of the filled polycarbonate compositions are essentially linear as the CS filler content increases and that the presence of polyethylene (PE) or the triblock rubber compound (TBR) had little affect on impact at the higher filler concentrations. Flexural yield and tensile strength decreased at higher PE and TBR concentrations as did the DTUL values. Melt flow, on the other hand, increased as the PE and TBR concentrations increased.

EXAMPLE 4

Following the procedure of Example 2, random, recycled, polycarbonate resin was employed to obtain pellets of polycarbonate compositions containing 20% by weight cenospheres and having a melt flow of 8.46. The pellets were re-extruded nine additional times without drying. The I.V. of the pellets from each re-extrusion was obtained and test samples of each of the re-extruded pellets were molded and subjected to the unnotched impact test. The results obtained are shown below in Table III.

TABLE III

Affect of Re-extrusion on Filled Polycarbonates Obtained from Recycled Resin

| | UNI (0.125") | Pellet I.V. (dl./g.) |
|---|---|---|
| Initial Regrind | >40.3 | 0.490 |
| 1st Re-extrusion | 11.33 | 0.476 |
| 3rd Re-extrusion | 27.33 | 0.459 |
| 6th Re-extrusion | 28.4 | 0.451 |
| 8th Re-extrusion | 26.4 | 0.446 |
| 10th Re-extrusion | 25.47 | 0.451 |

The results in Table III above show that impact decreased with the first re-extrusion, but then increased at the third re-extrusion. This increase is believed to be due to a more even distribution of the cenospheres filler in the resin which apparently does not improve significantly with additional re-extrusions.

EXAMPLE 5

The procedure of Example 4 was followed except that test samples were obtained after only the first re-extrusion and the physical properties of these test samples were compared with those of test samples obtained from a virgin, base polycarbonate resin containing 20% by weight cenosphere filler. The comparative results are shown in Table IV below:

TABLE IV

Comparative Physical Properties of Filled Re-extruded and Virgin Polycarbonates

| | Re-extruded Polycarbonate | Virgin Extruded Polycarbonate |
|---|---|---|
| NI (0.125") | 1.2 | 1.32 |
| UNI (0.125") | 15.2 | >40.0 |
| NI (0.250") | 1.87 | 1.09 |
| FY ($\times 10^{-3}$) | 15.1 | 14.7 |
| FM ($\times 10^{-3}$) | 436.0 | 402.0 |
| TY ($\times 10^{-3}$) | 0 | 8.72 |
| TB ($\times 10^{-3}$) | 8.87 | 7.99 |
| TE (%) | 6.0 | 58.0 |
| TI | 19.8 | 68.8 |
| DTUL @ 264 psi (°C.) | 131.3 | 135.0 |

From the results in Table IV above, it can be seen that unnotched Izod impact of the virgin resin is substantially greater than that for the re-extruded resin, but that the remaining impact values are almost comparable as are the DTUL values. With the exception of tensile break, the tensile properties of the virgin resin are better than those of the re-extruded resin. Nonetheless, the overall properties of the filled, re-extruded resin are quite acceptable for commercial use.

EXAMPLE 6

Two other commercially obtained fillers available under the trademarks Fillite, and Vial Fly Ash-Pozzolan were used to obtain test samples following the procedure of Example 2. The additional filler materials used are further identified as follows:

Fillite: a hollow fly ash cenosphere;
Vial Fly Ash-Pozzolan: a fly ash having a mean particle diameter of about 40u and whose magnetic particles have been removed; generally used as an additive in cement and is the parent product from which the cenospheres of the invention are obtained.

In addition, a third filler was also employed which was an unbeneficiated fly ash; i.e., fly ash obtained from the exhaust stacks of a coal fired boiler.

The physical properties of polycarbonate test samples containing these fillers at different concentrations were determined and are set forth in Table V below.

TABLE V

Physical Properties of Different Fillers at Various Concentrations in Polycarbonates

| Fillers: | Unbeneficiated Fly Ash | | | | Fillite | | | Pozzolan |
|---|---|---|---|---|---|---|---|---|
| Filler Wt. %: | 10 | 20 | 20[a] | 10[b] | 10 | 20 | 20[a] | 20 |
| NI (0.125") | 0.87 | 0.33 | 0.53 | 1.33 | 1.33 | 0.97 | 0.93 | 1.23 |
| UNI (0.125") | 14.0 | 2.13 | 3.75 | 11.26 | 10.53 | 4.27 | 4.40 | 20.76 |
| NI (0.250") | — | — | — | — | — | — | — | 1.02 |
| DGI (0.125") | — | — | — | — | — | — | — | 16.53 |
| FY ($\times 10^{-3}$) | 14.4 | 14.4 | 15.7 | 13.1 | 13.4 | 11.9 | 15.4 | 14.1 |
| FM ($\times 10^{-3}$) | 393.0 | 478.0 | 959.0 | 368.0 | 416.0 | 493.0 | 793.0 | 403.0 |
| TY ($\times 10^{-3}$) | — | — | — | — | — | — | — | 0 |
| TB ($\times 10^{-3}$) | — | — | — | — | — | — | — | 7.65 |
| TE (%) | — | — | — | — | — | — | — | 10.0 |
| DTUL @ 264 psi (°F.) | — | — | — | — | 263.3 | 270.5 | 277.7 | — |

[a]Includes 20% by weight commercially obtained glass fiber.
[b]Includes 5% by weight TBR (Kraton G-1651).

Comparing the results in Table V with those shown in Table II, it can be seen that the cenospheres of the invention exhibit significantly better impact and tensile properties than do other, commercially available filler materials.

EXAMPLE 7

The procedure of Example 2 was repeated wherein the test samples obtained contained cenosphere filler at concentrations of from 15–30 weight percent to optimize the physical properties for producing commercially acceptable polycarbonate compositions. The results obtained are shown in Table VI below.

TABLE VI

Optimization of Polycarbonate Compositions at Different Cenosphere Filler Concentrations

| | Wt. % Cenosphere (CS) Filler | | | | |
|---|---|---|---|---|---|
| | 0 | 15 | 20 | 25 | 30 | 30 |
| NI (0.125") | 16.0 | 1.53 | 1.33 | 1.2 | 0.8 | 0.8 |
| UNI (0.125") | 40.0 | 37.8 | 40.0 | 26.3 | 16.7 | 13.5 |
| NI (0.250") | 1.66 | 1.33 | 1.08 | 0.87 | 0.67 | 0.67 |
| DGI (0.125") | — | 26.7 | 24.8 | 18.2 | 10.7 | 10.6 |
| FY ($\times 10^{-3}$) | 13.2 | 13.5 | 13.6 | 13.8 | 13.8 | 13.5 |
| FM ($\times 10^{-3}$) | 317.0 | 377.0 | 401.0 | 439.0 | 471.0 | 479.0 |
| TY ($\times 10^{-3}$) | 9.31 | 8.82 | 8.87 | 8.89 | 0 | 0 |
| TB ($\times 10^{-3}$) | 9.72 | 7.14 | 7.16 | 0 | 9.1 | 8.61 |
| TE (%) | 121.0 | 39.0 | 47.0 | 9.0 | 6.0 | 5.0 |
| DTUL @ 264 psi (°F.) | 270.0 | 275.0 | 271.0 | 272.0 | 274.0 | 264.0 |
| MF | 9.22 | 9.38 | 9.47 | 9.94 | 9.85 | 10.46 |
| TI | 424.0 | 105.0 | 52.0 | 27.0 | 14.0 | 14.0 |

*Includes 0.3 wt. % mold release agent (pentaerythrityltetrastearate) based on the weight of the polycarbonate resin.

EXAMPLE 8

The procedure of Example 2 was repeated to obtain test samples containing the cenosphere filler of the invention. In addition, various commercially obtained impact modifiers were included in the base resin to determine their affect on the filler composition. The results obtained are set forth in Table VII below wherein the level of cenosphere filler was maintained at 10% by weight, the "Control" identifies the filled polycarbonate composition without an impact modifier and the amount of commercial impact modifier employed was on the basis of the filled resin and are identified as follows:

TBR—A styrene-b-(ethylene-butylene)-b-styrene copolymer commercially available under the product name, "Kraton G-1651" (as in Example 3 above);

MBS—A methyl methacrylate-butadiene-styrene graft copolymer commercially available under the product name, "Blendex IIIS";

PE—A polyethylene commercially obtained under the tradename "USI LB-742" (as in Example 3 above);

PP—A polypropylene commercially available under the product name, "Profax 6601";

BPA/DMS—A bisphenol-A/dimethylsiloxane block copolymer commercially available under the product name, "Copel".

TABLE VII

Affect of Impact Modifiers on Filled Polycarbonates

| | Impact Modifier (Wt. %) | | | | | |
|---|---|---|---|---|---|---|
| | Control | TBR (5) | MBS (5) | PE (3) | PP (3) | BPA/DMS 4 |
| NI (0.125") | 2.1 | 9.3 | 7.3 | 8.2 | 2.9 | 11.3 |
| UNI (0.125") | 40.0 | 40.0 | 38.9 | 40.0 | 22.0 | 40.0 |
| FY ($\times 10^{-3}$) | 14.6 | 12.9 | 13.1 | 13.5 | 13.6 | 13.4 |
| FM ($\times 10^{-3}$) | 371.0 | 338.0 | 351.0 | 352.0 | 355.0 | 358.0 |
| DTUL @ 264 psi (°F.) | 263.0 | 265.0 | 262.0 | 263.0 | 260.0 | 263.0 |
| Gardner Impact (in./lbs.) | 288.0 | 312.0 | 300.0 | 288.0 | 300.0 | 312.0 |
| MF | 9.52 | 9.58 | 7.46 | 9.36 | 10.63 | 9.58 |

The results in Table VII above indicate that the effectiveness of an impact modifier appears to depend upon the particular impact modifier used. For example, the BPA/DMS impact modifier raised the notched Izod from 2.1 to 11.3 whereas the PP impact modifier raised this value only 0.8. The effect of different concentrations of impact modifier can be seen by comparing the PE impact modifier results in Table VII above with those shown in Table II where the PE impact modifier was used at 2 and 4 weight percent levels, but wherein the cenosphere (CS) levels employed included concentrations higher than those in the test samples of Table VII. This comparison seems to indicate that the levels of cenosphere filler and impact modifier employed as well as the type of impact modifier used all affect the impact properties of the filled polycarbonate resins.

EXAMPLE 9

The procedure of Example 8 was followed to obtain test samples containing a glass reinforcement filler and different levels of the impact modifiers, but wherein the cenosphere filler content was again held at 10% by weight. The test samples obtained were heat aged at 140° C. for various periods and then subjected to the tensile impact strength test. The results obtained are shown in Table VIII below wherein the "Control" identifies the cenosphere filled polycarbonate composition without an impact modifier.

TABLE VIII

Tensile Impact Strength Data for Impact Modified, Filled Polycarbonates Heat Aged at 140° C.

| | Heat Aging Hours | | | | | | | | |
|---|---|---|---|---|---|---|---|---|---|
| Modifier (Wt. %) | 0 | 256 | 500 | 1000 | 1500 | 2000 | 3000 | 4000 | 5000 |
| Control | 67.6 | 56.0 | 63.1 | 68 | 50.4 | 53.6 | 37.8 | 48.0 | 33 |
| Glass Filler (10) | 26.2 | 20.9 | 18.7 | 29 | 35.7 | 30.6 | 44.6 | 28.3 | 18 |

TABLE VIII-continued

Tensile Impact Strength Data for Impact Modified,
Filled Polycarbonates Heat Aged at 140° C.

| Modifier (Wt. %) | Heat Aging Hours | | | | | | | | |
|---|---|---|---|---|---|---|---|---|---|
| | 0 | 256 | 500 | 1000 | 1500 | 2000 | 3000 | 4000 | 5000 |
| MBS (5) | 133.0 | 56.6 | 56.6 | 55 | 46.1 | 34.0 | 31.4 | 8.62 | — |
| PE (3) | 188.0 | 104.0 | 102.0 | 66 | 72.6 | 50.8 | 10.7 | 3.82 | — |
| PP (3) | 177.0 | 81.0 | 54.7 | 43 | 48.9 | 34.4 | 19.8 | 6.36 | — |
| BPA/DMS (4) | 196.0 | 110.0 | 131.0 | 121 | 124.5 | 74.5 | 60.8 | 50.0 | 33 |
| TBR (5) | 183.0 | 96.4 | 72.3 | 52 | 15.1 | 8.77 | 4.74 | 2.57 | 0 |

As the results in Table VIII show, the control without impact modifier retained more than half its impact resistance even after aging for 5000 hours and only the samples containing the BPA/DMS impact modifier retained any significantly measurable impact over this aging period. The addition of glass fibers to the Control at a level of 10% by weight resulted in an initial increase in impact, but after 5000 hours aging, the impact of this sample was lower than that of the Control.

EXAMPLE 10

Following the procedure of Example 8, impact modified test samples were obtained employing additional impact modifiers. The impact modifiers were employed at a level of 4.2 parts per hundred parts (pph) of the base resin and the base resin was filled with cenospheres (CS) at concentrations of 10% and 20% by weight. The test results obtained are shown in Table IX below wherein the additional, commercially obtained impact modifiers employed are identified as follows:

AR—An acrylic rubber compound available from Rohm & Haas under the product designation "7709 XP";

PE/C—A polyethylene compound available under the tradename, "Chemplex 5602";

PP/R—A rubber modified polypropylene compound available under the tradename, "Rexene PPX 0398";

RMPP—A rubber modified polypropylene available from Gulf Corp. under the product designation "PX 8202";

EPDM—A saturated ethylene-propylene rubber compound available from B. F. Goodrich Co. under the tradename, "Epcar 306G-8";

MP—4-Methylpentene-1 copolymer available from Mitsui Chemical Co. under the product designation "DX-830".

TABLE IX

Impact Modifiers at 4.2 pph in Polycarbonate Compositions
Filled with 10% and 20% by Weight Cenospheres

| Impact Modifier | Control | | TBR | | BPA/DMS | | PE | | MBS | | PE/C | |
|---|---|---|---|---|---|---|---|---|---|---|---|---|
| Wt. % CS | 10 | 20 | 10 | 20 | 10 | 20 | 10 | 20 | 10 | 20 | 10 | 20 |
| NI (0.125") | 2.13 | 1.07 | 8.40 | 1.07 | 8.13 | 2.4 | 5.73 | 1.33 | 4.27 | 2.0 | 7.07 | 1.87 |
| UNI (0.125") | >40 | 28.1 | >40 | 36.8 | >40 | >40 | >40 | 31.9 | >40 | 39.7 | >40 | 39.6 |
| NI (0.250") | 1.72 | 0.99 | 3.1 | 0.96 | 3.1 | 1.67 | 2.48 | 1.1 | 2.13 | 1.37 | 2.58 | 1.37 |
| DGI (0.125") | 37.1 | 20.2 | 22.6 | 13.8 | 7.14 | 10.8 | 3.39 | 4.58 | 32.4 | 20.5 | 30.9 | 18.3 |
| FY ($\times 10^{-3}$) | 14.5 | 15.0 | 13.4 | 14.2 | 13.5 | 12.9 | 13.5 | 13.6 | 13.7 | 13.6 | 13.5 | 13.5 |
| FM ($\times 10^{-3}$) | 393 | 438 | 364 | 415 | 367 | 419 | 365 | 405 | 362 | 402 | 359 | 395 |
| TY ($\times 10^{-3}$) | 8.5 | 8.90 | 8.12 | 8.46 | 8.08 | 7.56 | 8.18 | 8.19 | 8.23 | 8.06 | 8.15 | 8.12 |
| TB ($\times 10^{-3}$) | 8.75 | 7.04 | 8.53 | 6.78 | 9.14 | 7.38 | 9.38 | 7.08 | 8.32 | 7.46 | 8.53 | 7.46 |
| TE (%) | 27 | 25 | 29 | 37.7 | 31.5 | 56 | 34 | 47.7 | 26 | 54.3 | 27.5 | 55.7 |
| DTUL @ 264 psi | 268 | 261.7 | 265 | 262.7 | 262.8 | 262.8 | 267.3 | 264.5 | 264 | 267.3 | 267.1 | 269.1 |

| Impact Modifier | PP/R | | AR | | RMPP | | EPDM | | MP | |
|---|---|---|---|---|---|---|---|---|---|---|
| Wt. % CS | 10 | 20 | 10 | 20 | 10 | 20 | 10 | 20 | 10 | 20 |
| NI (0.125") | 2.93 | 1.2 | 3.33 | 1.2 | 2.53 | 1.0 | 2.93 | — | 2.67 | 1.0 |
| UNI (0.125") | >40 | 27.7 | >40 | 27.6 | >40 | 27.9 | >40 | — | >40 | 21.6 |
| NI (0.250") | 2.38 | 0.85 | 1.79 | 0.96 | 1.76 | 0.92 | 2.34 | — | 1.72 | 0.93 |
| DGI (0.125") | 3.5 | 4.72 | 6.92 | 11.5 | 10.98 | 11.6 | 15.31 | — | 3.08 | 6.84 |
| FY ($\times 10^{-3}$) | 13.4 | 13.5 | 13.5 | 13.6 | 13.3 | 13.6 | 13.1 | — | 13.7 | 14.2 |
| FM ($\times 10^{-3}$) | 369 | 401 | 367 | 393 | 367 | 387 | 350 | — | 369 | 398 |
| TY ($\times 10^{-3}$) | 8.31 | 8.32 | 8.30 | 8.42 | 8.35 | 8.43 | 8.21 | — | 8.56 | 8.76 |
| TB | | | | | | | | | | |

TABLE IX-continued

Impact Modifiers at 4.2 pph in Polycarbonate Compositions
Filled with 10% and 20% by Weight Cenospheres

| | | | | | | | | | | |
|---|---|---|---|---|---|---|---|---|---|---|
| ($\times 10^{-3}$) | 9.42 | 6.64 | 8.45 | 6.72 | 9.15 | 6.78 | 9.24 | — | 7.46 | 6.76 |
| TE (%) | 34 | 18 | 31 | 22.3 | 33 | 34.3 | 34 | — | 20.5 | 15.7 |
| DTUL @ 264 psi | 269.5 | 266.4 | 269.1 | 263.6 | 268 | 263.9 | 267 | — | 267 | 258.8 |

From the results set forth in Table IX above, it appears that at the 10% by weight filler level acceptable impact properties are obtained regardless of the impact modifiers employed, but at about the 20% by weight filler level, the effect of an impact modifier becomes marginal.

EXAMPLE 11

The melt flow (MF) of polycarbonate resins is indirectly related to their molecular weights; i.e., the higher the MF, the lower the molecular weight. Following the procedure of Example 2, test samples of polycarbonate compositions employing polycarbonate resins having different MFs and varying cenosphere (CS) filler concentrations were obtained and subjected to the impact tests. The results obtained are shown in Table X below.

the weight of the polycarbonate compositions. The results obtained are shown in Table XI.

TABLE XI

Effect of Cenosphere Filler on Glass Filled Polycarbonate Compositions

| | MF of Base Resins | | | |
|---|---|---|---|---|
| | 9.85* | 15.38 | 9.85 | 5.29 |
| NI (0.125") | 1.83 | 1.73 | 1.79 | 3.67 |
| with 5% CS added | 0.91 | 1.84 | 2.45 | 3.33 |
| UNI (0.125") | 23.3 | 29.9 | 33.3 | 40.0 |
| with 5% CS added | 7.3 | 20.9 | 32.8 | 32.8 |
| FY ($\times 10^{-3}$) | 16.5 | 15.9 | 16.4 | 15.4 |
| with 5% CS added | 16.8 | 15.4 | 15.3 | 15.2 |
| FM ($\times 10^{-3}$) | 552.0 | 533.0 | 565.0 | 493.0 |
| with 5% CS added | 579.0 | 554.0 | 541.0 | 537.0 |
| DTUL @ 264 psi (°F.) | 275.9 | 273.2 | 275.9 | 275.9 |
| with 5% CS added | 269.6 | 270.5 | 273.2 | 277.7 |

*Contained 0.75 pph of the flame retardant additive disclosed in U.S. Pat. No. 3,940,336.

TABLE X

Affect on Melt Flow of Base Resin and Filled Polycarbonate Compositions

| MF of Base Resin | 15.38 | | | 9.85 | | | 5.29 | | | 1.69 | | |
|---|---|---|---|---|---|---|---|---|---|---|---|---|
| Wt. % of CS | 5 | 15 | 30 | 5 | 15 | 30 | 5 | 15 | 30 | 5 | 15 | 30 |
| NI (0.125") | 1.66 | 1.32 | 0.72 | 3.06 | 1.53 | 0.80 | 2.13 | 1.86 | 1.2 | 4.87 | 2.05 | 1.0 |
| UNI (0.125") | 40.0 | 40.0 | 11.2 | 40.0 | 37.8 | 16.7 | 40.0 | 40.0 | 18.7 | 40.0 | 40.0 | 21.8 |
| NI (0.250") | 1.34 | 1.07 | 0.67 | 1.75 | 1.33 | 0.67 | 1.68 | 1.48 | 0.97 | 1.85 | 1.51 | 9.32 |
| FY ($\times 10^{-3}$) | 14.9 | 14.7 | 14.3 | 14.5 | 13.5 | 13.8 | 14.5 | 14.4 | 14.0 | 14.3 | 14.2 | 13.9 |
| FM ($\times 10^{-3}$) | 380.0 | 419.0 | 504.0 | 378.0 | 377.0 | 471.0 | 350.0 | 397.0 | 478.0 | 359.0 | 393.0 | 488.0 |
| TY ($\times 10^{-3}$) | 9.06 | 8.61 | 8.09 | 8.88 | 8.82 | 0 | 9.0 | 8.55 | 8.09 | 9.09 | 8.73 | 8.26 |
| TE (%) | 57.0 | 52.0 | 6.0 | 82.0 | 39.0 | 6.0 | 77.0 | 58.0 | 28.0 | 78.0 | 60.0 | 45.0 |
| MF of Filled Composition | 14.68 | 15.53 | 23.53 | 9.7 | 9.38 | 9.85 | 5.7 | 6.21 | 10.96 | 2.81 | 3.21 | 5.25 |

The results in Table X above reveal that impact properties of the filled polycarbonate compositions increased as the molecular weight of the base resin increased.

EXAMPLE 12

The effect of using a conventional, reinforcing filler with the filled polycarbonate compositions of the invention was determined by incorporating commercially obtained glass fibers into test samples of polycarbonate compositions prepared by following the procedure of Example 2 except that the base resins employed had different melt flows (MF). All of the test samples contained 9% by weight glass fibers whose impact properties were compared to the same test samples modified to include 5% by weight cenosphere (CS) filler, the glass fiber and cenosphere concentrations being based upon The results in Table XI reveal that the cenospheres of the invention can be added to polycarbonate compositions containing glass fiber reinforcing filler without deleteriously affecting the physical properties of these compositions.

EXAMPLE 13

The procedure of Example 12 was repeated except that the base resin employed was the same in all instances and the amount of glass fiber and cenosphere filler content was varied. In addition, some samples were modified to include the commercial TBR impact modifier identified in Example 8. The results obtained are set forth in Table XII below.

TABLE XII

Impact Properties of Polycarbonate Compositions Filled With Cenospheres and Glass Fibers

| | | | | | | | | | | |
|---|---|---|---|---|---|---|---|---|---|---|
| Wt. % Glass Fibers | 10.0 | 0 | 0 | 10.0 | 10.0 | 20.0 | 0 | 0 | 20.0 | 20.0 |
| Wt. % CS | 0 | 10.0 | 10.0 | 10.0 | 10.0 | 0 | 20.0 | 20.0 | 0 | 20.0 |
| Wt. % TBR | 0 | 0 | 5.0 | 0 | 5.0 | 0 | 0 | 5.0 | 0 | 5.0 |
| NI (0.125") | 1.8 | 2.13 | 9.33 | 2.13 | 3.33 | 2.0 | 0.93 | 1.20 | 0.93 | 1.21 |
| UNI (0.125") | 33.3 | 40.0 | 40.0 | 40.0 | 21.9 | 19.0 | 18.7 | 37.6 | 5.73 | 6.8 |
| FY ($\times 10^{-3}$) | 16.4 | 14.6 | 12.9 | 14.7 | 13.4 | 19.0 | 14.9 | 13.2 | 18.3 | 18.6 |
| FM ($\times 10^{-3}$) | 565.0 | 371.0 | 338.0 | 583.0 | 530.0 | 800.0 | 434.0 | 393.0 | 941.0 | 953.0 |
| DTUL @ 264 psi (°F.) | 276.0 | 263.0 | 265.0 | 280.0 | 278.0 | 295.0 | 261.0 | 256.0 | 278.0 | 274.0 |

From the results in Table XII above, it can be seen that the addition of glass fibers to cenosphere filled polycarbonate compositions had little or no effect on the impact values, but resulted in significant increases in flexural properties and the heat distortion temperature. Inclusion of an impact modifier in the polycarbonate compositions resulted in improved impact properties, but had little or no effect on the flexural properties and the heat distortion temperature.

EXAMPLE 14

Following the procedure of Example 2 test samples were obtained except that the amount of cenosphere filler included was varied. Spiral flow of the test samples was determined by passing the samples through a rectangular spiral mold having a diameter of about ¼ inch while maintaining the temperature of the melt constant at 570° F. The results obtained are set forth in Table XIII below.

TABLE XIII

Spiral Flow of Cenosphere Filled Polycarbonate Compositions

| Injection Pressure (psi) | 500 | | | 1000 | | | 1500 | | 1300* |
|---|---|---|---|---|---|---|---|---|---|
| Wt. % CS | 0 | 15 | 30 | 0 | 15 | 30 | 0 | 15 | 30 |
| Average Flow (inches) | 13.42 | 14.56 | 16.53 | 20.82 | 20.72 | 23.48 | 25.94 | 26.08 | 24.56 |
| % Increase in Flow | — | 8.50 | 23.17 | — | — | 12.78 | — | — | 13.7 |

*Spiral was filled (29.5") at 1500 psi, therefore, pressure was reduced to 1300 psi.

As the results in Table XIII indicate, the flow properties of cenosphere filled polycarbonate compositions are generally enhanced, but the percent increase in flow properties diminish as injection pressures are increased.

These results further indicate that polycarbonate compositions containing cenosphere filler exhibit exceptionally good flow properties for molding operations which typically employ pressures at the levels shown above in Table XIII.

EXAMPLE 15

The physical properties of injection foam molded test samples of the polycarbonate compositions were also determined. To obtain the foam molded samples, pellets were obtained following the procedure of Example 2 except that the level of cenosphere filler was varied. Using a conventional injection molding apparatus, these pellets were then injection molded together with a commercially obtained blowing agent concentrate available under the tradename "FLC-95" and employed at 5% by weight of the polycarbonate compositions. Foam molded test bars measuring ¼"×½"×2½" were obtained and their physical properties determined. The results are shown in Table XIV.

TABLE XIV

Physical Properties of Foam Molded Polycarbonate Compositions

| | Wt. % of CS Filler in Foam Molded Sample | | |
|---|---|---|---|
| Physical Properties | 10 | 20 | 30 |
| UNI (0.125") | 12.1 | 5.02 | 3.40 |
| Average Weight of 10 Molded Sample Bars (grams) | 51.31 | 43.60 | 48.45 |
| Specific Gravity | 1.002 | 0.844 | 0.946 |

The results in Table XIV above reveal that foamed articles can be obtained from polycarbonate compositions containing cenospheres which have acceptable physical properties. These foamed articles were observed to have a uniform cellular structure and a smooth surface.

EXAMPLE 16

The procedure of Example 15 was followed except that commercial impact modifiers as identified in Examples 8 and 10 were included in the test samples at a concentration of 4.2 pph of the base resin. Test bars were obtained as in Example 15 measuring ¼"×½"×5" and their physical properties determined. The results obtained are shown in Table XI wherein the impact values were determined using the dead end of the bar; i.e., the end of the bar farthest away from the gate, and the average weight is for 10 molded sample bars.

TABLE XV

Impact Modified Foam Molded Polycarbonate Compositions

| Wt. % CS in Foamed Sample | 10 | | 20 | |
|---|---|---|---|---|
| Physical Properties | (0.125") | (grams) | (0.125") | (grams) |
| Impact Modifier | | | | |
| None | 7.64 | 8.20 | 2.93 | 8.47 |
| TBR | 9.56 | 8.34 | 4.01 | 10.4 |
| BPA/DMS | 13.2 | 8.51 | 7.64 | 10.7 |
| PE | 8.10 | 8.55 | 4.74 | 10.1 |
| MBS | 9.99 | 8.38 | 4.63 | 8.49 |
| AR | 11.99 | 8.91 | 5.0 | 8.56 |
| PE/C | 11.13 | 9.14 | 4.74 | 9.91 |
| PP/R | 11.46 | 9.40 | 5.47 | 11.3 |
| RMPP | 11.46 | 9.37 | 5.47 | 11.3 |
| EPDM | 11.33 | 9.50 | — | — |
| MP | 10.67 | 10.2 | 5.8 | 12.1 |

As the results in Table XV reveal, inclusion of impact modifiers to cenosphere filled polycarbonate resins results in improved physical properties of the foam molded parts which also had a smoother surface finish than filled compositions without impact modifiers.

EXAMPLE 17

In this example, the cenospheres of the invention were first surface treated with various, commercially available surface active agents which were generally classified into three basic groups as follows:

| Group A: Silane Surface Active Agents | | |
|---|---|---|
| A-143 | (γ)-Chloropropyl-trimethoxy-silane | (Union Carbide Corp.) |
| A-151 | Vinyltriethoxysilane | " |
| A-153 | Phenyltriethoxysilane | " |
| A-162 | Methyltriethoxysilane | " |
| A-164 | Dimethyldiethoxysilane | " |
| A-172 | Vinyltris (2-methoxyethoxy) silane | " |
| A-174 | (γ)-Methacryloxy-propyltri-methoxysilane | " |
| A-186 | (β)-(3-4-epoxycyclohexyl) ethyl trimethoxysilane | " |
| A-187 | (γ)-Glicidoxypropyl-tri-methoxysilane | " |
| A-1100 | (γ)-Aminopropyltriethoxy silane | " |

-continued

| | | |
|---|---|---|
| Y-9078 | Carbamate functional silane | " |
| Y-9187 | M-octyltriethoxysilane | " |
| Z-6040 | (γ)-Glicidoxypropyl-trimethoxysilane | (Dow Corning Corp.) |
| S3076S | Silane sulfonyl[4] azide (50% active solution of S3076S silane in methylene chloride containing emulsifiers) | (Hercules Incorporated) |
| Group B: Non-Silane Silicone Surface Active Agents | | |
| VT | Vinyl tetramer (methyl-vinylcyclotetrasiloxane) | (General Electric Company) |
| MHSF | Methyl hydrogen silicone fluid | (General Electric Company) Rhodersill Company, Union Carbide Corp.) |
| R-555 | 70/30 diphenyl/dimethyl siloxane fluid, partially end capped | (General Electric Company) |
| Group C: Non-Silicone Surface Active Agents | | |
| MO | Mineral oil, laxative grade | |
| PIB | Polyisobutylene | ("Indopol L-14", Amoco Chemical Co.) |
| PPT | Propylene tetramer | (WR-105A, Arco Chemical Co.) |
| PETN | Pentaerythritoltetra-nonanoate | ("Rheolube" LP-3600) |
| ADGC | Allyl diglycol carbonate | (Pittsburgh Plate Glass Co.) |
| n-BA | n-Butylacrylate | |

The cenosphere (CS) employed was all taken from a single 500 lb. lot and surface treated as it came from the barrel by adding ten lbs. of cenosphere to an 8 quart Patterson-Kelly twin-shell liquid-solids blender and running the blender and intensifier bar for five minutes before adding the surface active agent in order to break up any lumps present and to obtain uniform material for treatment.

The silane surface active agents (Group A) were diluted with an equal volume of 50/50 methanol/water solution before addition, except for S3076S which was diluted with an equal volume of methylene chloride. The other surface active agents (Groups B and C) were added as received.

Each of the surface active agents (except the A-164/n-BA combination) was added slowly to the cenosphere through the intensifier bar and the resultant mixture was allowed to blend for five minutes after the last of the agent was added in order to insure a uniform dispersion. The thusly treated cenosphere was then emptied into a paper resin bag and oven dried at 120° C. overnight immediately before use. The A-164 agent was added to the cenosphere which was then dried as usual, but the highly volatile and odorous n-butylacrylate monomer was added later to the cenosphere during compounding, without initiator.

The physical properties of the molded samples obtained are shown below in Tables XVI-XX wherein the concentration of surface active agent employed is based upon the amount of cenosphere employed, which was maintained in each instance at 20 weight percent of the aromatic polycarbonate, the "Control" identifying a sample containing only oven-dried cenosphere.

TABLE XVI

Physical Properties of Polycarbonate Compositions Containing Cenospheres Treated with Silane Surface Active Agents (Group A)

| Surface Active Agent (Wt. %) | NI 0.125" | UNI (0.125") | FY ($\times 10^{-3}$) | FM ($\times 10^{-3}$) | TY ($\times 10^{-3}$) | TB ($\times 10^{-3}$) | TE (%) | DTUL @ 264 psi (°F) | Pellet IV (dl./g.) |
|---|---|---|---|---|---|---|---|---|---|
| Control | 1.0 | >40.0 | 14.6 | 401 | 9.170 | 7.280 | 46.0 | 133.4 | 0.484 |
| A-143 (1%) | 1.13 | 31.0 | 14.4 | 442 | 8.360 | 6.810 | 19.0 | 130.7 | 0.487 |
| A-151 (1%) | 1.93 | >40.0 | 14.2 | 427 | 8.300 | 7.480 | 43.7 | 132.4 | 0.491 |
| A-151 (2%) | 2.0 | 39.34 | 13.8 | 406 | 8.180 | 7.180 | 34.3 | 133.4 | 0.489 |
| A-153 (1%) | 1.13 | >40.0 | 14.3 | 420 | 8.500 | 7.340 | 47.7 | 131.9 | 0.479 |
| A-162 (1%) | 1.40 | >40.0 | 13.8 | 396 | 8.180 | 7.620 | 46.0 | 132.1 | 0.485 |
| A-164 (1%) | 2.36 | >40.0 | 13.5 | 423 | 7.510 | 7.540 | 57.3 | 132.9 | 0.489 |
| A-172 (1%) | 1.47 | >40.0 | 14.5 | 421 | 8.490 | 7.300 | 38.0 | 132.1 | 0.492 |
| A-172 (2%) | 1.73 | >40.0 | 14.0 | 403 | 8.270 | 7.730 | 55.3 | 133.9 | 0.484 |
| A-174 (1%) | 1.16 | 34.1 | 14.8 | 439 | 8.550 | 7.070 | 38.3 | 132.4 | 0.490 |
| A-186 (1%) | 1.61 | >40.0 | 14.7 | 438 | 8.230 | 7.250 | 39.0 | 131.4 | 0.495 |
| A-186 (2%) | 1.73 | >40.0 | 14.6 | 411 | 8.430 | 7.030 | 35.0 | 134.2 | 0.489 |
| A-187 (1%) | 1.11 | 32.1 | 14.5 | 423 | 8.840 | 6.990 | 22.3 | 131.6 | 0.488 |
| A-1100 (1%) | 1.05 | 21.0 | 14.4 | 446 | 8.550 | 6.800 | 13.0 | 132.0 | 0.483 |
| Y-9078 (1%) | 1.0 | 27.3 | 15.2 | 428 | 9.22 | 7.13 | 21.7 | 133.0 | 0.490 |
| Y-9078 (2%) | 0.87 | 22.2 | 15.4 | 438 | 9.26 | 7.23 | 33.0 | 131.9 | 0.484 |
| Y-9187 (1%) | 2.47 | >40.0 | 13.0 | 439 | 7.08 | 7.15 | 50.7 | 130.7 | 0.486 |
| Z-6040 (1%) | 1.09 | 32.0 | 14.9 | 425 | 8.99 | 7.06 | 26.7 | 132.3 | 0.485 |
| S3076S (1%) | 0.99 | 24.5 | 14.9 | 435 | 8.99 | 6.97 | 12.3 | 134.1 | 0.491 |
| A-186 (1%) A-1100 (1%) | 1.69 | 37.3 | 14.1 | 434 | 8.33 | 6.87 | 22.7 | 133.6 | 0.483 |
| A-186 (2%) A-1100 (1%) | 1.72 | 36.4 | 14.4 | 403 | 8.65 | 7.02 | 21.0 | 134.4 | 0.492 |
| A-187 (1%) A-1100 (1%) | 1.28 | 36.7 | 14.5 | 423 | 8.62 | 6.95 | 34.7 | 133.2 | 0.489 |

TABLE XVII

Physical Properties of Polycarbonate Compositions Containing Cenospheres Treated with Non-Silane Silicone Surface Active Agents (Group B)

| | Surface Active Agent (Wt. %) | | | |
|---|---|---|---|---|
| Physical Properties | Control | VT (1%) | MHSF (1%) | R-555 (1%) |
| NI (0.125") | 1.0 | 2.73 | 2.33 | 2.13 |
| UNI (0.125") | >40.0 | >40.0 | >40.0 | >40.0 |
| FY ($\times 10^{-3}$) | 14.6 | 13.2 | 13.2 | 13.3 |
| FM ($\times 10^{-3}$) | 401.0 | 406.0 | 401.0 | 403.0 |
| TY ($\times 10^{-3}$) | 9.17 | 7.53 | 7.61 | 7.42 |
| TB ($\times 10^{-3}$) | 7.28 | 8.15 | 8.49 | 7.99 |
| TE (%) | 46.0 | 67.0 | 73.0 | 67.0 |
| DTUL @ 264 psi (°C.) | 133.4 | 132.9 | 133.8 | 135.6 |
| Pellets IV (dl./g.) | 0.484 | 0.489 | 0.495 | 0.484 |

TABLE XVIII

Physical Properties of Polycarbonate Compositions Containing Cenospheres Treated with Non-Silicone Surface Active Agents (Group C)

| Physical Properties | Control | MO (1%) | PIB (1%) | PPT (1%) | PETN (1%) | ADGC (1%) |
|---|---|---|---|---|---|---|
| NI (0.125") | 1.0 | 1.07 | 1.0 | 1.07 | 1.0 | 1.2 |
| UNI (0.125") | >40.0 | 34.0 | 21.4 | 27.2 | 37.47 | 32.5 |
| FY ($\times 10^{-3}$) | 14.6 | 14.8 | 14.8 | 14.7 | 14.7 | 14.9 |
| FM ($\times 10^{-3}$) | 401.0 | 418.0 | 462.0 | 455.0 | 421.00 | 443.0 |
| TY ($\times 10^{-3}$) | 9.17 | 9.1 | 8.88 | 8.78 | 9.04 | 8.71 |
| TB ($\times 10^{-3}$) | 7.28 | 7.09 | 6.9 | 6.88 | 7.11 | 6.96 |
| TE (%) | 46.0 | 20.3 | 12.0 | 21.7 | 30.3 | 31.3 |
| DTUL @ 264 psi (°C.) | 133.4 | 131.2 | 128.7 | 130.8 | 131.1 | 129.9 |
| Pellet IV (dl./g.) | 0.484 | 0.480 | 0.487 | 0.486 | 0.483 | 0.485 |

TABLE XIX

Physical Properties of Polycarbonate Compositions Containing Cenospheres Treated with Combinations of Surface Active Agents

| Physical Properties | A-151 (1%)* | n-BA (1%) A-151 (1%) | A-164 (1%)* | PIB (1%) A-164 (¾%) |
|---|---|---|---|---|
| NI (0.125") | 1.93 | 1.73 | 2.36 | 2.16 |
| UNI (0.125") | >40.0 | >40.0 | >40.0 | >40.0 |
| FY ($\times 10^{-3}$) | 14.2 | 13.8 | 13.5 | 13.5 |
| FM ($\times 10^{-3}$) | 427.0 | 415.0 | 423.0 | 416.0 |
| TY ($\times 10^{-3}$) | 8.3 | 8.01 | 7.51 | 7.73 |
| TB ($\times 10^{-3}$) | 7.48 | 7.4 | 7.54 | 7.84 |
| TE (%) | 43.7 | 49.3 | 57.3 | 59.0 |
| DTUL @ 264 psi (°C.) | 132.4 | 132.5 | 132.9 | 132.6 |
| Pellet IV (dl./g.) | 0.491 | 0.486 | 0.489 | 0.491 |

*Data from Table XVI for comparison only.

TABLE XX

Differences in Physical Properties of Polycarbonate Compositions Containing Cenospheres "As Received" and Those Containing Blended and Dried Cenospheres

| Physical Properties | Cenospheres (20 Wt. %) As Received | Blended Dried |
|---|---|---|
| NI (0.125") | 1.06 | 1.0 |
| UNI (0.125") | 30.5 | >40.0 |
| FY ($\times 10^{-3}$) | 14.8 | 14.6 |
| FM ($\times 10^{-3}$) | 443.0 | 401.0 |
| TY ($\times 10^{-3}$) | 8.88 | 9.17 |
| TB ($\times 10^{-3}$) | 7.12 | 7.28 |
| TE (%) | 42.0 | 46.0 |
| DTUL @ 264 psi (°C.) | 131.1 | 133.4 |
| Pellet IV (dl./g.) | 0.485 | 0.484 |

From the results set forth in Tables XVI-XX above, it can be seen that silane surface active agents (Group A) generally do not deleteriously affect the physical properties of the polycarbonate composition and those containing aliphatic functional groups gave the most significant increase in impact resistance; e.g., Table XVI, A-151, A-153, A-162, A-164, A-172, A-186, Y-9187. While some of these silane surface active agents resulted in substantial increases in flexural modulus of the polycarbonate composition, there was also a decrease in unnotched Izod impact and tensile elongation; e.g., Table XVI, A-143, A-151, A-174, A-187, A-1100, Y-9078, Z-6040, S3076S.

Some of the non-silane silicone surface active agents (Group B) result in a slight decrease in the overall physical properties of the polycarbonate composition (Table XVII).

Pre-mixing of the treated cenospheres to obtain homogeneity followed by oven drying prior to incorporating them in the polycarbonate compositions results in a significant increase in all physical properties except for a slight overall decrease in flexural modulus (Table XX).

In general, pre-treating cenospheres with the foregoing types of surface active agents appears to improve the overall physical properties of the polycarbonate composition at concentrations of up to about 2 weight percent based upon the amount of cenosphere employed and that silicone fluids appear to result in polycarbonate compositions having significantly improved overall physical properties.

What is claimed is:

1. A filled polycarbonate composition comprising an admixture of a high molecular weight aromatic polycarbonate resin and a particulate filler in an amount of about 2-40% by weight of the total weight of said polycarbonate composition, said particulate filler consisting essentially of an amorphous, alumino silicate glass recovered from flyash with the magnatile portion thereof removed and in the form of solid spheres having a specific gravity of about 2.4, a bulk density of about 75-80 lbs./ft.$^3$, a mass median diameter of about 5-6 microns, and a pH of about 3-8.

2. The composition of claim 1 wherein the amount of said particulate filler is about 10-30% by weight.

3. The composition of claim 1 wherein said polycarbonate resin is derived from 2,2-bis(4-hydroxyphenyl)-propane and has a melt flow of about 0.5-20.

4. The composition of claim 1 which includes an impact modifier in an amount of about 1-5% by weight of said polycarbonate composition.

5. The composition of claim 1 which includes a glass filler in an amount of up to about 20% by weight of said polycarbonate composition.

6. The composition of claim 1 wherein said particulate filler contains a surface active agent in amounts of up to about 2% by weight of said particulate filler, said surface active agent being a member selected from the group consisting of silanes, non-silane silicones, non-silicones, and mixtures thereof.

7. The composition of claim 6 wherein said surface active agent is a silicone fluid.

8. A filled polycarbonate composition comprising an admixture of a high molecular weight aromatic polycarbonate resin having a melt flow of about 0.5-20 and a particulate filler in an amount of about 2-40% by weight of the total weight of said polycarbonate composition, said particulate filler consisting essentially of an amorphous alumino silicate glass recovered from flyash with the magnatile portion thereof removed and in the form of solid spheres having a specific gravity of about 2.4, a bulk density of about 75-80 lbs./ft.$^3$, a mass median diameter of about 5-6 microns, and a pH of about 3-8.

9. The composition of claim 8 wherein said particulate filler is present in an amount of about 10-30% by weight.

10. The composition of claim 8 wherein said polycarbonate resin is derived from 2,2-bis(4-hydroxyphenyl)-propane.

11. The composition of claim 8, which includes an impact modifier in an amount of about 1-5% by weight of said polycarbonate composition.

12. The composition of claim 8 which includes a glass filler in an amount of up to about 20% by weight of said polycarbonate composition.

13. The composition of claim 8 wherein said particulate filler contains a surface active agent in amounts of up to about 2% by weight of said particulate filler, said surface active agent being a member selected from the group consisting of silanes, non-silane silicones, non-silicones, and mixtures thereof.

14. The composition of claim 13 wherein said surface active agent is a silicone fluid.

15. A foamed article obtained from a thermoplastic polycarbonate composition, said composition comprising an admixture of a high molecular weight aromatic polycarbonate resin and a particulate filler in an amount of about 2-40% by weight of said polycarbonate composition, said particulate filler consisting essentially of an amorphous, alumino silicate glass recovered from flyash with the magnatile portion thereof removed and in the form of solid spheres having a specific gravity of about 2.4, a bulk density of about 75-80 lbs./ft$^3$, a mass median diameter of about 5-6 microns, and a pH of about 3-8.

16. The foamed article of claim 15 wherein the amount of said particulate filler is about 10-30% by weight.

17. The foamed article of claim 15 wherein said polycarbonate resin is derived from 2,2-bis(4hydroxyphenyl)propane and has a melt flow of about 0.5-20.

18. The foamed article of claim 15 which includes an impact modifier in an amount of about 1-15% by weight of said polycarbonate composition.

19. The foamed article of claim 15 which includes a glass filler in an amount of up to about 20% by weight of said polycarbonate composition.

20. The composition of claim 15 wherein said particulate filler contains a surface active agent in amounts of up to about 2% by weight of said particulate filler, said surface active agent being a member selected from the group consisting of silanes, non-silane silicones, non-silicones, and mixtures thereof.

21. The composition of claim 20 wherein said surface active agent is a silicone fluid.

22. A particulate filler for use in thermoplastic resin compositions, said particulate filler consisting essentially of an amorphous, alumino silicate glass recovered from flyash with the magnatile portion thereof removed and in the form of solid spheres having a specific gravity of about 2.4, a bulk density of about 75-80 lbs./ft.$^3$, a mass median diameter of about 5-6 microns, and a pH of about 3-8; and, a surface active agent selected from the group consisting of silanes, non-silane silicones, non-silicones, and mixtures thereof.

23. The particulate filler of claim 22 wherein said surface active agent is present in amounts of up to about 2% by weight of said particulate filler.

24. The particulate filler of claim 22 wherein said surface active agent is a silicone fluid.

* * * * *